United States Patent
Mottram

(10) Patent No.: US 7,680,707 B2
(45) Date of Patent: Mar. 16, 2010

(54) MUNICIPAL PERSONAL PROPERTY TAX COMPLIANCE METHOD, SYSTEM, AND COMPUTER PROGRAM PRODUCT

(76) Inventor: Harry Mottram, 600 Main St., Suite One, Monroe, CT (US) 06468

( * ) Notice: Subject to any disclaimer, the term of this patent is extended or adjusted under 35 U.S.C. 154(b) by 1058 days.

(21) Appl. No.: 11/006,366

(22) Filed: Dec. 6, 2004

(65) Prior Publication Data
US 2006/0122919 A1 Jun. 8, 2006

(51) Int. Cl.
G06F 17/22 (2006.01)
(52) U.S. Cl. ....................................................... 705/31
(58) Field of Classification Search ................ 705/30, 705/31
See application file for complete search history.

(56) References Cited

U.S. PATENT DOCUMENTS

| | | | | |
|---|---|---|---|---|
| 5,870,733 | A * | 2/1999 | Bass et al. | 707/2 |
| 6,792,145 | B2 * | 9/2004 | Gay | 382/190 |
| 7,155,404 | B1 * | 12/2006 | Johnson et al. | 705/19 |
| 2002/0032625 | A1 * | 3/2002 | Brown | 705/30 |
| 2002/0107764 | A1 * | 8/2002 | McCoy | 705/30 |
| 2003/0046129 | A1 * | 3/2003 | Brecher | 705/7 |
| 2003/0046211 | A1 * | 3/2003 | Brecher | 705/36 |
| 2003/0061131 | A1 * | 3/2003 | Parkan, Jr. | 705/30 |
| 2003/0126047 | A1 * | 7/2003 | Hollar et al. | 705/30 |
| 2003/0167216 | A1 * | 9/2003 | Brown et al. | 705/30 |
| 2003/0167217 | A1 * | 9/2003 | Formale et al. | 705/30 |
| 2005/0080702 | A1 * | 4/2005 | Modi | 705/36 |

OTHER PUBLICATIONS

The 2004 Grenwich, Connecticut Declaration of Personal Property Form.*
State of Colorado Declaration Commercial Personal Property Declaration Schedule.*
State Tax Review. Chicago: Oct. 12, 2004. vol. 65, Iss. 41; p. 10, 1 pgs.*
"PPD, Inc.; PPD Reports First Quarter 2008 Financial Results." Real Estate & Investment Business Apr. 28, 2008: Career and Technical Education, ProQuest. Web. Oct. 22, 2009.*

* cited by examiner

Primary Examiner—Matthew S Gart
Assistant Examiner—Oluseye Iwarere
(74) Attorney, Agent, or Firm—Alfred A. Fressola; Ware, Fressola, Van Der Sluys & Adolphson LLP

(57) ABSTRACT

A method and system for ensuring property tax compliance are disclosed, in order to assist municipalities in achieving high accuracy compliance in the Personal Property Declaration (PPD) filings that they receive from taxpayers. The invention achieves greater total assessments of taxable property, in an equitable manner. This municipal personal property tax compliance program (MPPTCP) would change the way a state's municipalities enforce personal property tax assessment statutes. The invention includes a method for auditing a PPD, the PPD being a report of taxable property of a filer who is an individual or a business. According to this method a PPD is automatically analyzed to detect possible inaccuracies, by comparing the PPD with data provided by other PPDs. If the possible inaccuracies are detected, then a report is generated that identifies at least some of those possible inaccuracies.

15 Claims, 3 Drawing Sheets

MUNICIPAL PERSONAL PROPERTY TAX COMPLIANCE METHOD, SYSTEM, AND COMPUTER PROGRAM PRODUCT

FIELD OF THE INVENTION

The present invention relates to taxation, and more particularly to technology for use by local taxing authorities.

BACKGROUND OF THE INVENTION

Personal property subject to taxation in many states is taxed at the municipal level, while being regulated by state statute and administered by a state's executive branch. Revenues are typically kept by the taxing municipality, and contribute to the support of their annual budget.

Most commonly, all personal property is subject to taxation, unless specifically exempted by state statute, and qualifying taxable property is often owned by commercial entities. Therefore, a municipal taxing authority deals with predominately businesses and commercial interests.

Taxable personal property must typically be reported on an annual basis to the respective municipal tax assessor. The reporting document is commonly referred to as a Personal Property Declaration, and this term "Personal Property Declaration" (PPD) will be used here as a broad term to cover such documents.

In order to ensure accuracy m submitted PPDs, statutory authority provides broad powers to the (municipal) tax assessor and certain qualified others acting on behalf of the assessor. Audits of PPDs are typically time-restricted, in that they are limited to a specified number of years (e.g. the current and previous two years).

Heretofore, a municipality has typically had only two options available in order to track down unreported taxable assets: (1) employ personnel to audit selected filers, or (2) outsource to a private company. Interestingly, neither of the aforementioned methods have had much of a long-term impact on "compliance," which is defined here as an accurate reporting of all taxable assets. One possible reason for this situation is that neither of these two options involves "compliance" as a specific goal, and neither has employed a process which is designed to achieve it over the long term. Instead, these two options are typically driven by short-term revenue goals only.

A method for improving accuracy of PPDs is needed that establishes "compliance" as the primary goal. If the long-term goal is not directed towards increased "compliance" in annual filings, then the program will result in lower efficiency and effectiveness in collecting potential tax revenue.

It is a generally accepted fact that a significant percentage of PPDs filed with the local assessor's office each year contain inaccurate information, usually in the form of under-reported taxable assets. In addition, many filers fail to include the required information on leased property, even though this information is needed to reconcile with the property owner's filing. Moreover, some people who are legally obligated to file do not bother to file at all.

There are a number of reasons to account for these shortcomings in filed PPDs, ranging from clerical error to intentional misrepresentation. Generally, the accuracy of these reports has suffered from the inattention given them by the taxing authority. Internal staff shortages and antiquated computer systems, as well as ineffective outsourcing programs, have severely limited the ability of municipal assessors to correct the situation.

Further contributing to the problem is the fact that many errors relate to structural problems such as the taxpayer's fiscal year being out of phase with the October 1 day of record, for taxable personal property. Additional error can arise from the fact that the expense/depreciation rules for federal tax purposes differ from Personal Property Declaration schedules.

Regardless of the reason, attempts to raise compliance through manual audits have proven ineffective. Outsourcing to service companies that use typical prior art audit methodology may enhance revenue, but accomplish little for "compliance." A new approach is needed to provide the catalyst for compliance. Former methods have failed and, in some cases, have had costly outcomes resulting from court actions taken by the taxpayer. All of the former programs were revenue-driven, with "compliance" given only passing attention.

SUMMARY OF THE INVENTION

The present invention offers a multifaceted approach to achieve high accuracy compliance in Personal Property Declaration (PPD) filings. The present invention is compliance-driven, and creates an environment of high public awareness. The program is fair and equitable since it incorporates all taxpayers. An effective application of the program ensures a reduction of costs for the municipality, as compliance increases.

This approach involves examining all Personal Property Declarations by means of a highly structured process, utilizing sophisticated detection tools and "show me" response requirements. This approach also includes pursuing an environment of high-intensity publicity regarding the program. Additional facets of the invention include providing the capability for Internet submission of Personal Property Declarations, and establishing a comprehensive property tax information web site for taxpayer reference.

The present invention achieves high accuracy compliance in Personal Property Declaration filings, in a fair and equitable manner, resulting in significantly higher total assessments. A particularly significant aspect of the invention is that it will normally entail examining substantially all Personal Property Tax Declarations filed, within statutory limitations. The invention validates the accuracy of the data submitted on the declarations for each year. For example, in Connecticut, state law allows the audit of the current year and previous two years. At the same time, the present multifaceted approach captures accurate data/values from other tax and financial documents.

Major features of the present claimed method include: initiating a high level of publicity to increase awareness of filers; identifying and pursuing non-filers; inputting data for all filers for current and previous years; analyzing data reported using a proprietary discriminate index formula (PDIF); and establishing examination priorities.

The municipal personal property tax compliance program (MPPTCP) disclosed herein is designed to assist municipalities in achieving high accuracy compliance in Personal Property Declaration filings, resulting in significantly greater total assessments. In the majority of cases, no on-site inspections are required. A preferred embodiment of the program includes "original cost-less depreciation" analysis, which is a widely accepted standard and has been approved by various state courts. It also includes a structured methodology that simplifies the validation process. Moreover, the program is designed to have minimum impact on a tax assessor's staff; instead, declarations are evaluated using the proprietary discriminate index formula (PDIF). The present invention preferably ensures that substantially all declarations will be examined and validated for every eligible year, thereby enhancing the compliance factor, and the compliance factor is further enhanced by generating media interest that in turn increases taxpayer awareness.

Accordingly, the present invention includes a method for auditing a personal property declaration (PPD), the PPD being a report of taxable property from a filer who is an individual or a business. According to this method, the PPD is automatically analyzed to detect possible inaccuracies, for example by comparing the PPD (including data from or about the PPD) with data from or about at least one other PPD (i.e. preferably more than one other PPD). If possible inaccuracies are detected, then a report is generated that identifies possible inaccuracies. Correspondence is subsequently generated and sent to the filer requesting documentation supporting their claim, in defense of the possible inaccuracies identified. The possible inaccuracy can be in the PPD, or the inaccuracy can be in one or more of the at least one other PPD, or the inaccuracy can simply be the fact that another PPD should be filed (e.g. by a lessor) in addition to the PPD (e.g. of a lessee) that is being automatically analyzed. In the last case, the data can simply be the fact that the lessor's PPD has not yet been filed.

The at least one other PPD can be from a filer different from the filer whose PPD is being automatically analyzed, or it can be a previously filed PPD of the same filer whose PPD is being automatically analyzed. Moreover, in one preferable embodiment, the at least one other PPD can include a combination of both a PPD from another filer in addition to a PPD previously filed by the same filer whose PPD is being automatically analyzed.

The present invention also includes software for auditing a personal property declaration (PPD). The audit includes automatically analyzing the PPD to detect possible inaccuracies. This is done by detecting arithmetic, copying, and missing or conflicting data errors on each PPD, documenting certain critical information for cross-reference purposes, comparing the PPD with previous years' filings, and comparing with like entity PPD filings. If the possible inaccuracies are detected, then the software generates a report that identifies possible inaccuracies.

The present invention further includes a system for auditing a personal property declaration (PPD). The system includes a processor, for automatically analyzing the PPD to detect possible inaccuracies, by comparing the PPD with data provided by other PPDs. The system also includes a memory unit for storing that data. Additionally, the system includes a user interface, for reporting possible inaccuracies detected by the processor.

DETAILED DESCRIPTION OF THE INVENTION

Figure 1:
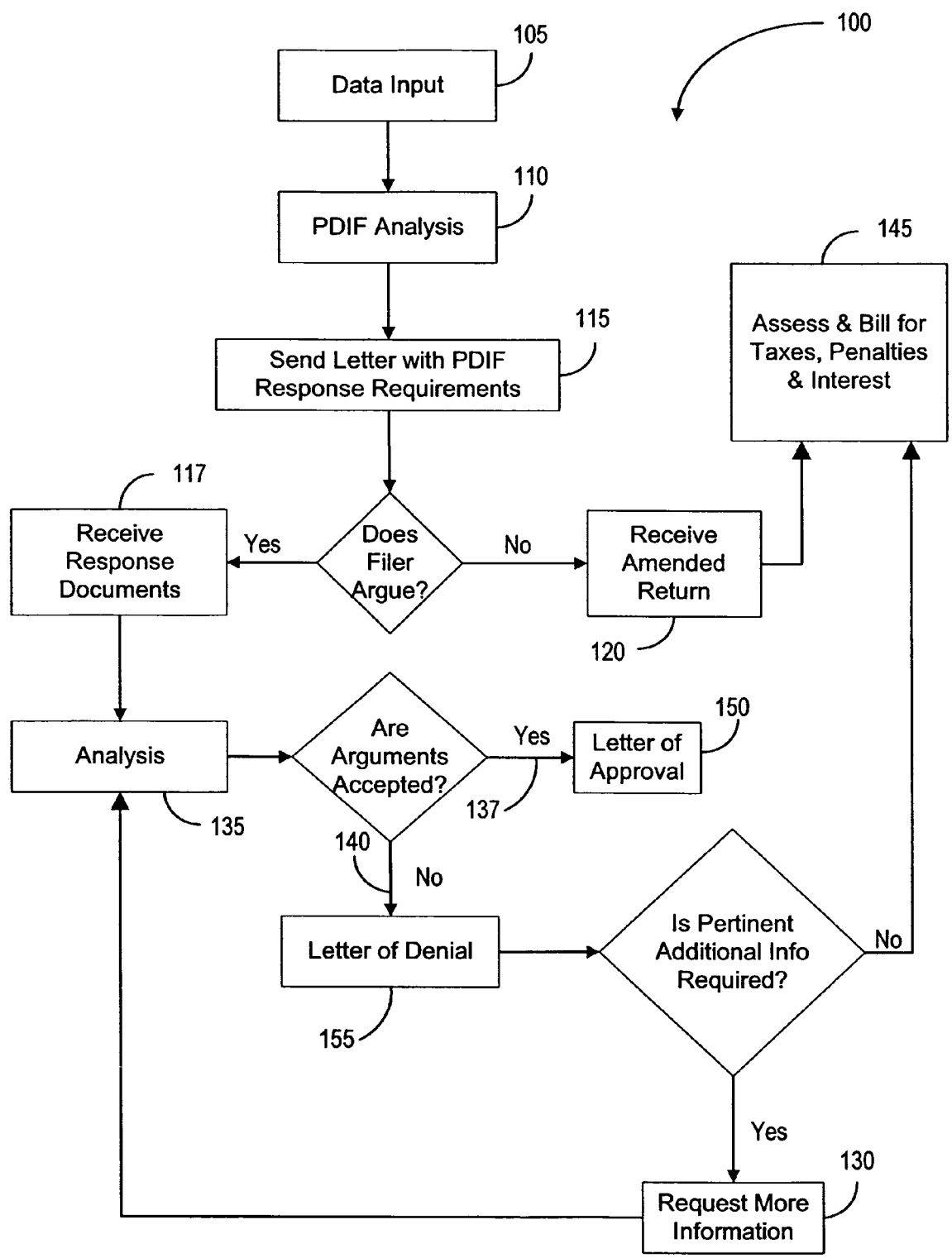
FIG. 1 illustrates how a proprietary discriminate index formula (PDIF) fits in the context of an audit of taxpayer data, according to an embodiment of the present invention.

FIG. 1 graphically illustrates a process 100 according to an embodiment of the present invention, for inputting data, analyzing data, and communicating with the taxpayer.

On a spread sheet platform, data from each taxpayer's Personal Property Declaration for the current and previous years (3 years or more if available), are entered 105 by several possible means. These include scanning, direct entry, and e-mail importation.

Each reporting entity is identified and classified by business type, as reported on the PPD filed. A further breakdown of the classification is done when the Federal Tax "SIC" code is captured upon audit.

Then, an analysis program, which is referred to as the "Proprietary Discriminate Index Formula" (PDIF), is utilized 110. The PDIF can perform a variety of important steps, such as the following.

The PDIF detects arithmetic, copying, missing and conflicting data errors on each PPD. These errors often include incorrect summations, transpositions, and reconciliations.

The PDIF records leased property reported for cross-reference verification of required filing by a property owner (e.g. a lessor). At present, few if any states in the United States have towns that typically perform a cross reference validation of lessee/lessor filings. Since many lessors are located out-of-state and are unfamiliar with the state's reporting requirements, their personal property is often not reported and therefore untaxed. Connecticut law, for example, holds the lessee responsible by default if they fail to report their leased property.

The PDIF detects errors in carryover and disposal of declared property from the previous year. These errors involve values reported in each property category from the previous year, reconciled property values carried over, and/or reported disposal of property.

The PDIF notes detected errors on the page where detected and summarizes those errors on a summary page. The summary page allows quicker screening of PPD.

The PDIF standardizes values reported for each category of assets, by determining the ratio of each category to the sum of all assets reported. This ratio is subsequently used to examine assets declared by all filers for a given category of filers. For example, if we select all "Law Firms" reporting, a "standardized value" for the category "Electronic Data Processing Equipment" allows comparison of small, medium, and large firms.

The PDIF reports an "aged value" for each category of assets. These aged values are the ratio of depreciated assets values to their original costs. This provides a tool to detect under-reporting of assets when values fall short of the mean of the standardized values for the category of asset within a business class. Depreciation rates are often fixed by the state government, and have no relationship to depreciation methods reflected in the taxpayer's books or the taxpayer's federal tax returns.

The PDIF also reports a comparison between the previous year's values and the current year's "adjusted values." The "adjusted value" for the current year is calculated by subtracting the newly added assets declared for the current year and adding back the disposed assets. This allows the "zeroing out" of values of assets carried over from the previous year and detecting errors in those that do not zero out.

The PDIF furthermore reports the statistical results of an analysis of this reporting entity's values as they relate to the group of reporting entities within their specific category. The collection of all reporting entities and their data are maintained on a master data spread sheet and cross-linked to each individual workbook, providing 2-way data transfers.

The statistical values reported by the PDIF include the median value for the asset category. The median value is used rather than the mean value, in order to lessen the impact of one or two large reporting entities skewing the results of a reporting class containing a relatively small number.

The statistical values reported by the PDIF also include the unbiased standard deviation of the asset category. This is a modified formula in that the median value is substituted for the mean value. The modified unbiased standard deviation is determined by, first, subtracting the median value from each value in the data set, and then taking the square of this difference. Then, the squared values are summed and subsequently divided by the number of values in the data set minus one. The square root of this result provides the modified unbiased standard deviation.

The statistical values reported by the PDIF also include a statistical confidence level, based on the modified unbiased standard deviation and a predetermined target percentage. The confidence level uses a preset 80% value parameter in its formula, as applied to reported data analysis. Using that preset value, the area under the standard normal curve that equals 1.00 minus 0.80 is calculated providing a value of 1.28155. This factor, multiplied times the modified unbiased standard deviation divided by the square root of the number of values in the data set, provides the confidence level value. Further, once sufficient audited data is obtained, a correlation coefficient value is determined and directly linked to this formula in the form of a multiplier, as described further below.

The statistical values reported by the PDIF also include a threshold value. This threshold value is an expected minimum value that equals the median value less the confidence level value.

The statistical values reported by the PDIF also include a PASS/FAIL indicator, signaling the status of the declared value in meeting the threshold value.

These statistical values reported by the PDIF exist in a dynamic environment, in that they will change as the number of reporting entities are added. Additionally, detection capabilities of under-reported assets are enhanced through the use of dynamic valuation discrimination standards. Audit results for each business classification and asset category are tabulated separately and a correlation coefficient is determined through the comparison of the two data sets: "reported" and "audited." The discriminate nature of the correlation coefficient values results in a dynamic environment, since they continually change with audit experience. Therefore, the statistical discriminate values will become more relevant as they are enhanced by experience. Once sufficient "audited" data is obtained, the correlation coefficients between the data sets will be directly factored into the confidence level formula, enhancing its reliability as a highly discriminate and accurate audit tool.

Correlation values reported by the PDIF further assist in identifying business classifications that require closer scrutiny. For example, if we find that the business class "landscaping companies" has low correlation ratios between reported and audited, then that business class calls for closer scrutiny.

According to this embodiment of the invention, all files are reviewed by qualified persons, and items requiring validation are noted on a document requisition form, which includes response requirements and is incorporated in the taxpayer's workbook/spreadsheet. This document requisition form will be accompanied by a cover letter 115 generated on the tax assessor's letter head. The cover letter is linked to the document requisition form via a standard word processing mail merge feature. Since all files are scheduled for review, priorities may or may not be set, depending on the preferences of the contracting municipality.

Cover letters are customized pursuant to the contracting municipality's preference. Taxpayers will be given 30 days, for example, to respond with the requested documentation, either with rebuttal arguments 117 or without 120 rebuttal arguments. Time extensions are granted as needed. Response documentation is analyzed 135 by qualified staff, and a finding is made and accordingly recorded in the taxpayer's workbook/spreadsheet. A request for further documentation 130 may be made, which is generated in the same fashion as the original request, but with a different cover letter. The taxpayer's arguments will either be accepted 137 or rejected 140, to be followed by an approval letter 150 or denial letter 155 respectively.

When finalized, changes made to the taxpayer's declaration must be made on a certificate of correction, and a copy mailed to the taxpayer, which is typically described by state statute. The certificate is incorporated in the taxpayer's workbook/spreadsheet and is merged, as before, with a cover letter.

Prior to mailing the certificate of correction, the file developed during the audit is submitted to the assessor for final review and approval. If the results of the audit are approved, the assessor signs the certificate of correction and mails to the taxpayer.

Once notice is given to the taxpayer, the assessor communicates to the tax collector using the certificate of correction, and the tax collector issues a tax bill 145 within a required time which may be specified by statute. The bill, of course, will either be paid in full 160, or not paid in full 165. This ends the basic process other than data storage.

An additional component of this process can involve sales taxes. Collecting sales taxes made on purchases via mail order or the Internet has become a chronic problem for many states, including Connecticut. Since the municipal personal property tax compliance program herein disclosed examines all businesses for personal property tax purposes for the benefit of the municipality, tracking sales/use tax liability during this process for the state government is an added feature. Such a statewide program in conjunction with the municipalities would increase compliance for all businesses in filing sales/use taxes.

The presently disclosed municipal personal property tax compliance program is adaptable to any tax collection system. In particular, it is especially suited for the tax system in Connecticut, and in other states having a similar tax system.

Implementation of the present program can be greatly enhanced by promoting media attention. Media interest would likely be increased because some may perceive the program as Orwellian in nature inasmuch as the program intends to examine all declarations. The mere suggestion of Orwellian "big brother" oversight will likely attract free media attention, and this fact should be exploited. In reality, it does not matter how the media perceives the program, and instead the key factor is that the media is used to benefit the program, in that enhancing the quantity and intensity of the publicity raises public awareness. Publicity involving enforcement programs has been shown to have an immediate and dramatic impact on compliance. The IRS knows this. That is why they publish their successful court cases at the beginning of each tax season. In the long run, the media will eventually become supportive of the presently disclosed program, when they recognize the program's successes and understand that the underlying premise of the program is one of fairness. Therefore, initial controversy will be very useful to the program, and will later give way to general approval.

Figure 2:
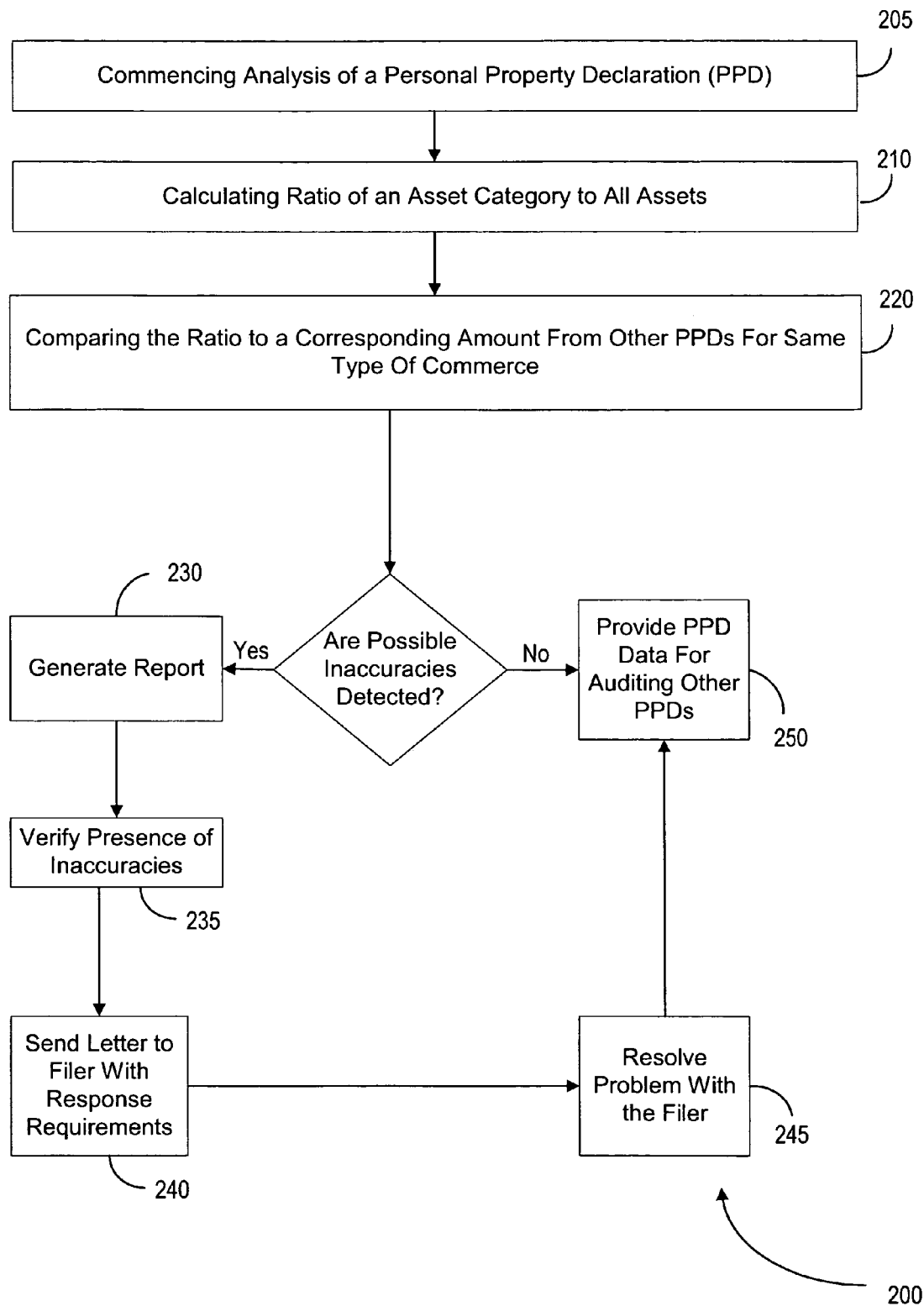
FIG. 2 shows how the PDIF is used to analyze a personal property declaration (PPD) according to an embodiment of the present invention.

Turning now to FIG. 2, this shows a method 200 according to another embodiment of the present invention, beginning with commencement 205 of the PPD analysis. This analysis includes calculating 210 a ratio of an asset category to all assets reported on the PPD. Then that ratio is compared 220 to a corresponding amount from other PPDs for the same type of commerce. The corresponding amount can be, for example, a median of the corresponding ratios for the other PPDs. If a possible inaccuracy is detected, then it may be reported 230 to a user, who may be an accountant, tax assessor, or other person assigned to process the filer's PPD. That user can verify 235 whether the inaccuracy exists, in which case a letter is sent 240 to the filer asking for further information or clarification or confirmation, and ultimately the inaccuracy 245 is resolved with the filer (of course, if the user discovers that there is really no significant inaccuracy, then the steps described in this sentence can be skipped). Ultimately, the data from the PPD can be provided 250 to enhance the database that will be used to analyze further PPDs.

Figure 3:
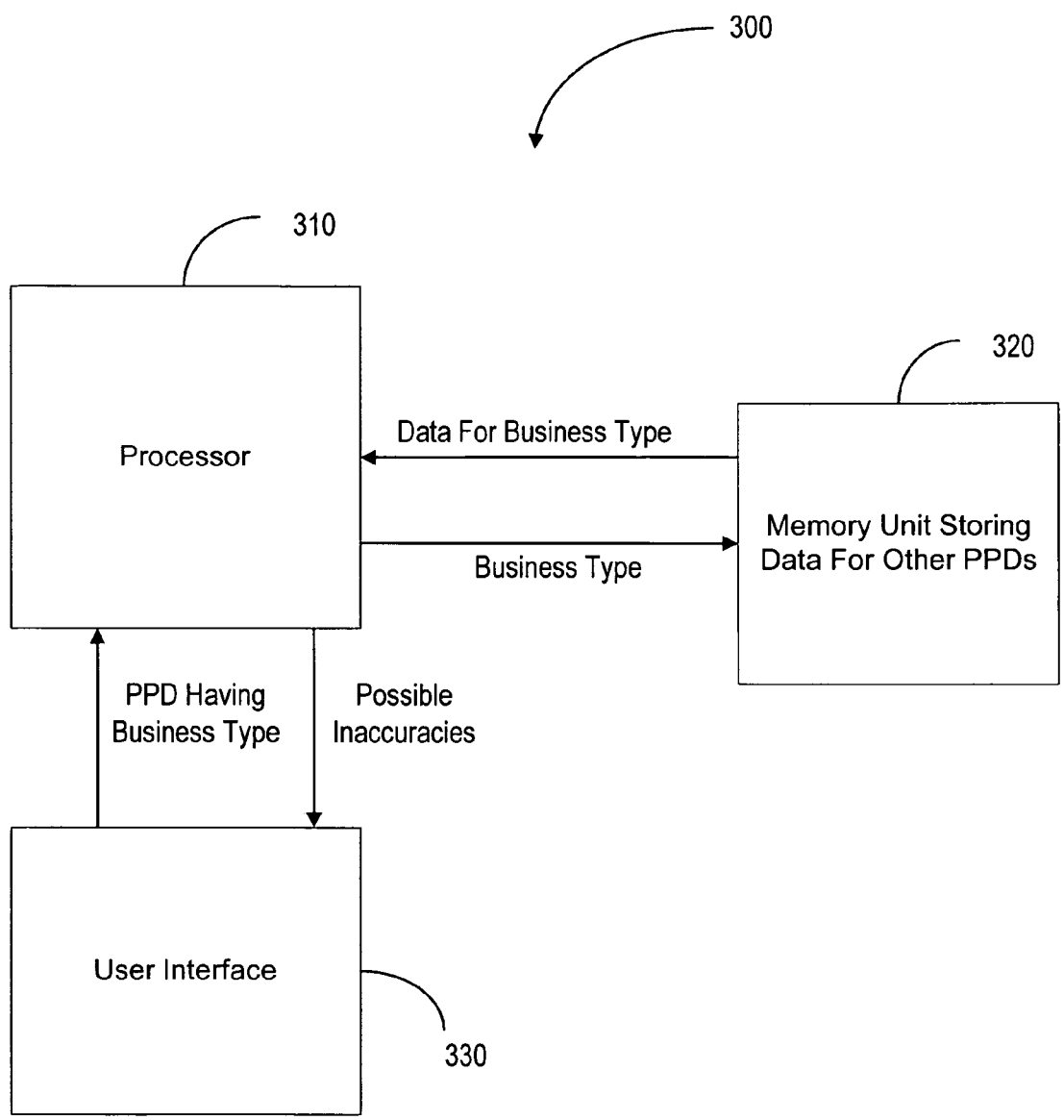
FIG. 3 depicts a system according to an embodiment of the present invention.

Turning now to FIG. 3, this shows a system 300 according to a further embodiment of the present invention. A user interface 330 can include a display screen and keyboard, and may also include an insertion device to insert PPDs for scanning. In any event, the user interface 330 provides a PPD (or PPD data) having a particular business type associated with that PPD, to a processor 310. The processor then sends an inquiry to a memory unit 320, specifying the business type for the PPD. In response, the memory unit 320 provides to the processor 310 data for other PPDs having the same business type. These other PPDs may be for different filers, or may be previous filings of the same filer. In any event, the processor 310 is then able to compare the PPD, provided by the user interface 330, to corresponding data from other PPDs, in order to detect possible inaccuracies in the PPD provided by the user interface 330. Finally, those possible inaccuracies are reported from the processor 310 to the user interface 330.

It is to be understood that all of the present figures, and the accompanying narrative discussions of best mode embodiments, do not purport to be completely rigorous treatments of the invention under consideration. A person skilled in the art will understand that the steps described herein represent general cause-and-effect relationships that do not exclude intermediate interactions of various types, and will further understand that the various components and structures described herein can be implemented by a variety of different combinations of hardware and software which need not be further detailed.

What is claimed is:

1. A method for auditing a personal property declaration, said method comprising:

automatically analyzing, with a processor, the personal property declaration to detect possible inaccuracies, by comparing the personal property declaration with data about or from at least one other personal property declaration;

detecting, with the processor, at least one of the possible inaccuracies, generating an inaccuracy report that identifies at least part of said at least one of the possible inaccuracies, said inaccuracy report being visible at least on a user interface;

wherein said personal property declaration is a report of taxable property from a filer who is an individual or a business, wherein the at least one other personal property declaration pertains to a type of commerce that is engaged in by the filer, wherein the analyzing includes calculating a ratio of a category of assets to a larger amount of assets reported on the personal property declaration, and wherein the comparing includes comparing the ratio to a corresponding ratio calculated for one or more of the at least one other personal property declaration, wherein said at least one of the possible inaccuracies is detected when said comparing indicates that said ratio is substantially different from said corresponding ratio; and wherein said personal property is movable and is reported and recorded at most in said personal property declarations.

2. The method of claim 1, wherein one or more of the at least one other personal property declaration was submitted by the filer during a previous year.

3. The method of claim 1, wherein one or more of the at least one other personal property declaration was submitted by an individual or business distinct from the filer.

4. The method of claim 3, wherein the filer is located in a municipality in which substantially all of the at least one other personal property declaration are audited.

5. The method of claim 3, wherein the personal property declaration is used for providing data to audit one or more of the at least one other personal property declaration.

6. The method of claim 1, wherein the comparing is performed using a proprietary discriminate index formula.

7. The method of claim 4, further comprising increasing public compliance by using media to inform the public that auditing will be substantially inevitable.

8. The method of claim 1, further comprising recording at least some data from the personal property declaration for use in auditing the at least one other personal property declaration.

9. The method of claim 8, wherein the recording includes noting whether the filer is a lessee, and wherein the at least one other personal property declaration includes a personal property declaration, of a corresponding lessor, that is, should be, or will be filed.

10. The method of claim 1, wherein the corresponding amount is substantially equal to a median, instead of a mean, of corresponding ratios calculated for a plurality of the at least one other personal property declaration.

11. The method of claim 1, wherein the larger amount is a total amount of the assets reported on the personal property declaration.

12. A computer readable medium encoded with a software data structure for auditing a personal property declaration, wherein executing said software wherein executing the software includes automatically analyzing the personal property declaration to detect possible inaccuracies, by comparing the personal property declaration with data provided by other personal property declarations, and wherein at least one of the possible inaccuracies is detected and the software data structure generates a report that identifies at least some of said possible inaccuracies, wherein said personal property declaration is a report of taxable property from a filer who is an individual or a business, wherein at least one of said other personal property declarations pertains to a type of commerce that is engaged in by the filer, wherein the analyzing includes calculating a ratio of a category of assets to a larger amount of assets reported on the personal property declaration, and wherein the comparing includes comparing the ratio to a corresponding ratio calculated for one or more of the other personal property declarations, wherein said at least one of the possible inaccuracies is detected when said comparing indicates that said ratio is substantially different from said corresponding ratio; and wherein said personal property is movable and is reported and recorded at most in said personal property declarations.

13. A system for auditing a personal property declaration, the system comprising:

a processor for automatically analyzing the personal property declaration to detect possible inaccuracies, by comparing the personal property declaration with data provided by other personal property declarations;

a memory unit for storing the data; and a user interface, for reporting at least one of the possible inaccuracies, when said at least one of the possible inaccuracies is detected by the processor, wherein said personal property declaration is a report of taxable property from a filer who is an individual or a business, wherein at least one of said other personal property declarations pertains to a type of commerce that is engaged in by the filer, wherein the analyzing by the processor includes calculating a ratio of a category of assets to a larger amount of assets reported on the personal property declaration, and wherein the comparing by the processor includes comparing the ratio to a corresponding ratio calculated for one or more of the other personal property declarations, wherein said at least one of the possible inaccuracies is detected when said comparing indicates that said ratio is substantially different from said corresponding ratio, and wherein said personal property is movable and is reported and recorded at most in said personal property declarations.

14. A method for auditing a personal property declaration, said method comprising:

analyzing the personal property declaration, with a processor, to detect possible inaccuracies, by comparing the personal property declaration with data about or from at least one other personal property declaration;

detecting, with the processor, at least one of the possible inaccuracies, and generating an inaccuracy report that identifies at least part of said at least one of the possible inaccuracies, said inaccuracy report being visible at least on a user interface;

wherein a type of commerce declared by the at least one other personal property declaration is also declared by the personal property declaration that is compared with the at least one other personal property declaration, wherein the analyzing includes calculating a ratio of a category of assets to a larger amount of assets reported on the personal property declaration, and wherein the comparing includes comparing the ratio to a corresponding ratio calculated for one or more of the at least one other personal property declaration, and wherein said at least one of the possible inaccuracies is detected when said comparing indicates that said ratio is substantially different from said corresponding ratio.

15. The method of claim 14, wherein one or more of the at least one other personal property declaration was submitted by the filer during a previous year.

* * * * *